(12) United States Patent
Aslaksen et al.

(10) Patent No.: US 11,275,367 B2
(45) Date of Patent: Mar. 15, 2022

(54) DYNAMICALLY MONITORING SYSTEM CONTROLS TO IDENTIFY AND MITIGATE ISSUES

(71) Applicant: Bank of America Corporation, Charlotte, NC (US)

(72) Inventors: Geoffrey George Aslaksen, Matthews, NC (US); Johnna Carter, Richardson, TX (US); Bradley P. Welch, Fort Mill, SC (US); Christofer Hoff, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 427 days.

(21) Appl. No.: 16/543,759

(22) Filed: Aug. 19, 2019

(65) Prior Publication Data

US 2021/0056202 A1 Feb. 25, 2021

(51) Int. Cl.
| | |
|---|---|
| *G05B 13/02* | (2006.01) |
| *G05B 23/02* | (2006.01) |
| *G06F 21/55* | (2013.01) |
| *G06N 20/00* | (2019.01) |
| *G05B 19/042* | (2006.01) |
| *H04L 29/06* | (2006.01) |
| *G06N 7/00* | (2006.01) |

(Continued)

(52) U.S. Cl.
CPC ..... *G05B 23/0232* (2013.01); *G05B 19/0428* (2013.01); *G06F 21/552* (2013.01); *G06F 21/554* (2013.01); *G06N 20/00* (2019.01); *E21B 44/00* (2013.01); *G05B 13/0285* (2013.01); *G05B 2219/24015* (2013.01); *G06F 2221/034* (2013.01); *G06N 7/005* (2013.01); *G06Q 10/06393* (2013.01); *H04L 63/1416* (2013.01)

(58) Field of Classification Search
CPC .... G06F 9/4856; G06F 9/45558; G06F 9/461; G06F 9/4821; G06F 9/5077; G06F 9/544; G06F 2009/4557; G06F 21/354; G05B 19/0428; G05B 13/0285; G05B 23/0232; G06N 20/00; G06N 7/005; G06Q 10/06393; E21B 44/00; H04L 63/1416
See application file for complete search history.

(56) References Cited

U.S. PATENT DOCUMENTS

| | | |
|---|---|---|
| 8,744,894 B2 | 6/2014 | Christiansen et al. |
| 9,141,805 B2 | 9/2015 | Giakouminakis et al. |

(Continued)

*Primary Examiner* — Tuan A Vu
(74) *Attorney, Agent, or Firm* — Banner & Witcott, Ltd.

(57) ABSTRACT

Arrangements for dynamic system control evaluation and issue identification and mitigation are provided. In some examples, data may be received from a plurality of sources. The data may be received in batches at predetermined intervals or time periods, and/or as streaming data. In some examples, a first system control may be identified and a first system control value may be determined for the first system control. A plurality of threshold ranges associated with the first system control may be identified and the first system control value may be compared to the plurality of threshold ranges. Based on the comparing, the first system control value may be mapped to an objective score on a cyber health scale. The objective score may then be evaluated to determine whether an issue is occurring or is likely to occur. If so, one or more mitigation actions may be identified and implemented.

21 Claims, 14 Drawing Sheets

(51) Int. Cl.
 *E21B 44/00* (2006.01)
 *G06Q 10/06* (2012.01)

(56) References Cited

U.S. PATENT DOCUMENTS

| | | |
|---|---|---|
| 9,342,690 B2 | 5/2016 | Lietz et al. |
| 9,411,965 B2 | 8/2016 | Giakouminakis et al. |
| 9,800,605 B2 | 10/2017 | Baikalov et al. |
| 9,825,983 B1 | 11/2017 | Yu |
| 10,095,866 B2 | 10/2018 | Gong et al. |
| 10,122,748 B1 | 11/2018 | Currie |
| 10,289,838 B2 | 5/2019 | Singla et al. |
| 2008/0028470 A1 | 1/2008 | Remington et al. |
| 2009/0204234 A1* | 8/2009 | Sustaeta ............. G05B 13/0285 700/29 |
| 2010/0017049 A1* | 1/2010 | Swearingen ........... G06N 7/005 701/3 |
| 2014/0277752 A1* | 9/2014 | Chang .................... E21B 44/00 700/275 |
| 2015/0025942 A1* | 1/2015 | Ross ................ G06Q 10/06393 705/7.39 |
| 2017/0134418 A1 | 5/2017 | Minoli et al. |
| 2018/0004948 A1 | 1/2018 | Martin et al. |
| 2018/0077188 A1 | 3/2018 | Mandyam et al. |
| 2018/0124098 A1 | 5/2018 | Carver et al. |
| 2018/0191763 A1 | 7/2018 | Hillard et al. |
| 2020/0267183 A1* | 8/2020 | Vishwanath ........ H04L 63/1416 |

* cited by examiner

Control Health Variable A threshold range / points = increments

| Range | Division | Sub-range | Points |
|---|---|---|---|
| 100>=80 | 20/3=6.6 | 93.4 to 100 | 10 |
| | | 86.7 to 93.3 | 9 |
| | | 80 to 86.6 | 8 |
| <80>=70 | 10/3=3.3 | 77.7 to 79.9 | 7 |
| | | 73.4 to 76.6 | 6 |
| | | 70 to 73.3 | 5 |
| <70>=50 | 20/3=6.6 | 63.4 to 69.9 | 4 |
| | | 56.7 to 63.3 | 3 |
| | | 50 to 56.6 | 2 |
| | | 0 to 49.9 | 1 |

FIG. 2A

Control Health Variable B threshold range / points = increments

| Range | Division | Sub-range | Points |
|---|---|---|---|
| 100>=95 | 5/3=1.6 | 98.4 to 100 | 10 |
| | | 96.7 to 98.3 | 9 |
| | | 95 to 96.6 | 8 |
| <95>=90 | 5/3=1.6 | 93.3 to 94.9 | 7 |
| | | 91.7 to 93.2 | 6 |
| | | 90 to 91.6 | 5 |
| <90>=75 | 15/3=5 | 85.1 to 89.9 | 4 |
| | | 80.1 to 85 | 3 |
| | | 75 to 80 | 2 |
| | | 0 to 74.4 | 1 |

FIG. 2B

DYNAMICALLY MONITORING SYSTEM CONTROLS TO IDENTIFY AND MITIGATE ISSUES

BACKGROUND

Aspects of the disclosure relate to electrical computers, systems, and devices for executing real-time evaluation of system controls. In particular, one or more aspects of the disclosure relate to real-time, dynamic monitoring of system controls to identify and mitigate issues.

Cyber threats are an important concern for any enterprise. Monitoring systems, devices, and the like, to ensure systems are secure, efficient, operating as expected, and the like, can be a time consuming and inefficient process. Further, it is often difficult to identify issues quickly (e.g., before an impact is felt or before an impact is worsened) and to determine where to allocate resources for mitigation actions because an evaluation of each system control might not be easily comparable to evaluation of other system controls. Accordingly, it would be advantageous to evaluate systems in real-time to objectively evaluate a health of a system control, quickly identify any issues and initiate mitigation actions.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with providing real-time, dynamic evaluation of system controls or control health variables to objectively determine a status, identify issues and initiate mitigation actions.

In some examples, data may be received from a plurality of sources. The data may be received in batches at predetermined intervals or time periods, and/or as streaming data. In some arrangements, the received data may be analyzed to evaluate a plurality of control health variables. For instance, a first control health variable may be identified and a first control health variable value may be determined for the first control health variable. In some examples, a plurality of threshold ranges associated with the first control health variable may be identified and the first control health variable value may be compared to the plurality of threshold ranges. Based on the comparing, the first control health variable value may be mapped to an objective score on a cyber health scale. The objective score may then be evaluated to determine whether an issue is occurring or is likely to occur. If so, one or more mitigation actions may be identified and implemented.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A and 2B illustrate example thresholds and cyber health scales for example control health variables in accordance with one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Some aspects of the disclosure relate to dynamic control health variable evaluation and issue mitigation functions. As discussed above, monitoring a health of one or more system controls is an important part of maintaining cyber security. Accordingly, aspects described herein provide an objective measure of wellness of various different control health variables so that issues may be identified, mitigation actions may be initiated and resources may be allocated efficiently.

As discussed herein, aspects described herein are directed to receiving and monitoring data from a plurality of sources to evaluate, in real-time, a health of one or more system controls or control health variables. In some examples, the data may be received and each system control or control health variable may be evaluated and measure of a status of one or more categories for the system control or control health variable may be determined. The measurement may be represented as a percentage and may be compared to a plurality of threshold ranges unique to each system control or control health variable. Based on the comparing, the percentage or control health variable value may be mapped to an objective score on a cyber health scale. This objective score may then be further analyzed using, for example, machine learning, to determine whether an issue is occurring or is likely to occur, identify one or more mitigating actions, initiate one or more mitigating actions, or the like.

These and various other arrangements will be discussed more fully below.

Figure 1A:
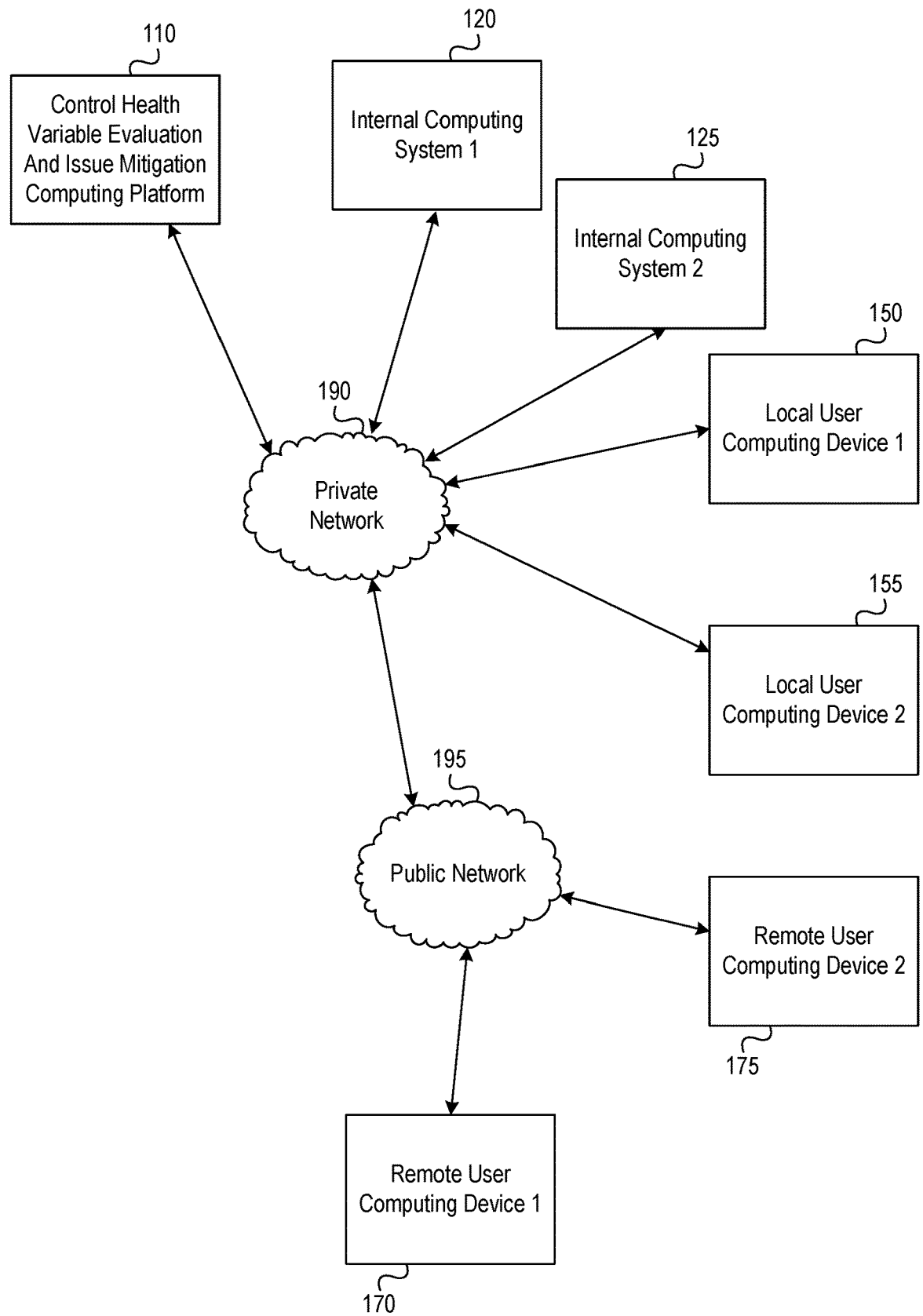
FIGS. 1A and 1B depict an illustrative computing environment for implementing dynamic control health variable evaluation and issue mitigation functions in accordance with one or more aspects described herein.
Figure 1B:
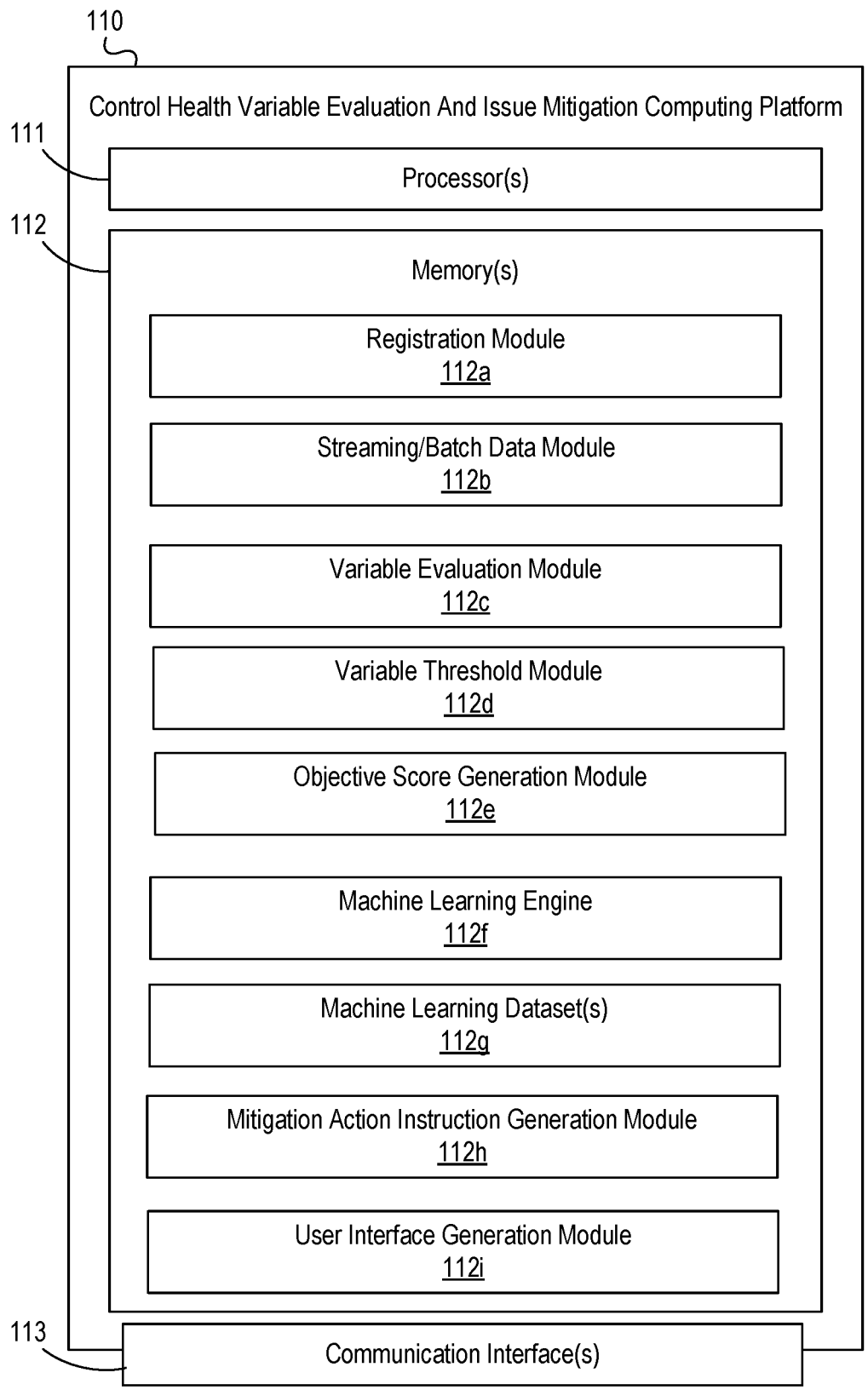

FIGS. 1A and 1B depict an illustrative computing environment for implementing and using a system for system control or control health variable evaluation and issue mitigation computing platform in accordance with one or more aspects described herein. Referring to FIG. 1A, computing environment 100 may include one or more computing devices and/or other computing systems. For example, computing environment 100 may include control health variable evaluation and issue mitigation computing platform 110, a first internal computing system 120, a second internal computing system 125, a first local user computing device 150, a second local user computing device 155, a first remote user computing device 170, and a second remote user computing device 175. Although two internal data computing systems are shown in FIG. 1A, more or fewer computing systems may be used without departing from the invention.

Control health variable evaluation and issue mitigation computing platform 110 may be configured to provide intelligent, dynamic evaluation of system controls or control health variables to determine an objective score that may be compared to other objective scores in order to identify potential issues, identify mitigating actions, execute mitigating actions, and the like. In some examples, the control health variable evaluation and issue mitigation computing platform 110 may receive, from one or more data sources, system control or control health variable data. In some examples, the control health variable data maybe batch data. The control health variable evaluation and issue mitigation computing platform 110 may further receive, from one or more data sources, streaming data including system control or control health variable data. In some examples, the one or more data sources from which the batch data may be received may be different data sources from the one or more data sources from which the streaming data is received. In other examples, the data sources may be the same.

In some arrangements, the batch data and streaming data may be analyzed to determine a system control or control health variable value for a first system control or control health variable. In some examples, control health variable values may be determined for one or more control health variables.

In some arrangements, the control health variable evaluation and issue mitigation computing platform 110 may evaluate categories such as efficiency, efficacy, coverage and performance. One or more other categories may be considered without departing from the invention. In some arrangements, measuring efficiency may include measuring the ability to execute a control with the least waste or resources to produce a result. Some example system controls that may be evaluated for efficiency may include anti-virus and host intrusion detection (e.g., events detected based on the average time from host infection to detection within an expected period of identification (e.g., 3 days, 7 days, 10 days, or the like)). In some examples, the measurement of the anti-virus and host intrusion system control or control health variable may include a percentage based on a number of events detected within the expected time period divided by the total number of events over the time period.

Another example system control or control health variable that may be evaluated for efficiency may include data at rest (e.g., data at rest scans completed for each environment within a defined time period (e.g., 3 days, 7 days, 10 days, 30 days, or the like)). In some examples, the measurement of efficiency of data at rest may include a percentage based on scan completion time minus scan start time for each environment divided by an average time to scan a population.

Yet another example system control or control health variable that may be evaluated for efficiency may include data in motion (e.g., high-risk email events resulting in notification or escalation within a time period (e.g., 6 hours, 8 hours, 24 hours, 36 hours, or the like)). In some examples, the measurement of efficiency of data in motion may include a percentage based on a number of events notified or escalated within the time period divided by the total number of events notified or escalated.

In some examples, measuring efficacy may include measuring the ability of a control to produce a desired result or outcome. An example system control or control health variable that may be evaluated for efficacy may include email malware prevention (e.g., true positive email malware detection cases). In some examples, the measurement of efficacy of email malware prevention may include a percentage based on a number of true positive email malware detection cases divided by a total number of malware detection cases or email malware detection cases.

Another example system control or control health variable that may be evaluated for efficacy may include internet monitoring and analysis (e.g., true positive internet monitoring and analysis events that are notified or escalated that come back as non-business related or true escalations). In some examples, the measurement of efficacy of internet monitoring and analysis may include a percentage based on a number of notifications and escalations that come back as true positives divided by a total number of escalations.

Yet another example system control or control health variable that may be evaluated for efficacy may include data in motion (e.g., true positive detection events by policy). In some examples, the measurement of efficacy of data in motion may include a percentage based on a number of true positive detections by policy divided by a total number of detections across a policy.

In some examples, measuring coverage may include measuring the deployed scope of a control or control health variable. An example system control or control health variable that may be evaluated for coverage may include anti-virus and host intrusion detection (e.g., hosts that have anti-virus tools installed and enabled on them across an enterprise). In some examples, the measurement of coverage for anti-virus and host intrusion detection may include a percentage based on a total number of hosts with a particular tool installed divided by a total number of sites or shares.

Another example system control or control health variable that may be evaluated for coverage may include internet monitoring and analysis (e.g., regional blocking based on internet monitoring and analysis quality control testing). In some examples, the measurement of coverage of internet monitoring and analysis may include a percentage based on a number of passing quality control items by region divided by a total number of quality control items.

Still another example system control or control health variable that may be evaluated for coverage may include data at rest (e.g., scanning based on open sites or shares). In some examples, the measurement of coverage of data at rest may include a percentage based on a number of sites or shares with open access divided by a total number of sites or shares.

In some examples, measuring performance of one or more controls or control health variables may include validating that the system control is performing as designed. One example system control or control health variable that may be evaluated for performance may include internet monitoring and analysis (e.g., quality assurance on events to ensure they were actioned properly). In some examples, the measurement of performance of internet monitoring and analysis may include a percentage based on a number of passing quality assurance items divided by a total number of quality assurance items.

Another example system control or control health variable that may be evaluated for performance may include data at rest (e.g., scan performance based on mock data tests). In some examples, the measurement of performance for data at rest may include a percentage based on a number of test files containing mock data detected successfully divided by a total number of test files planted in collaboration with a site.

Still another example system control or control health variable that may be evaluated for performance may include data in motion (e.g., data in motion alerts that were analyzed correctly through a manual quality assurance process). In some examples, the measurement of performance of data in motion may include a percentage based on a number of alerts analyzed accurately divided by a number of alerts in a quality assurance sample size.

Accordingly, the measurements described above (e.g., percentages) may be the determined system control or control health variable value that may be used in additional processes described herein.

The above described categories, system controls or control health variables, and measurements are some examples that may be used with aspects described herein. Additional system controls or control health variables, categories and/or measurements may be used without departing from the invention.

In some examples, a plurality of threshold ranges may be determined for each system control or control health variable. In some examples, the plurality of threshold ranges may be based on the particular system control or control health variable. For instance, each system control or control health variable may have respective threshold ranges used in the analysis that may be the same, or different, from threshold ranges used to evaluate other control health variables.

After the plurality of threshold ranges are identified, the determined system control or control health variable value may be compared to the plurality of threshold ranges and the system control or control health variable value may be mapped to a threshold range of the plurality of threshold ranges. Based on the mapping, an objective score on a scale, such as a cyber health scale may be determined. In some examples, the cyber health scale may be a same scale for all system controls or control health variables (e.g., regardless of type of variable, identified threshold ranges, or the like).

In some examples, the control health variable evaluation and issue mitigation computing platform may compare the objective score to an impact threshold. In some examples, the impact threshold may identify objective scores in a range in which an issue may occur. If the score is equal to or greater than the impact threshold, one or more mitigation actions may be identified. The one or more mitigation actions may be implemented to mitigate an impact of any potential issue identified based on the objective score as compared to the impact threshold. In some arrangements, machine learning may be used to identify whether a potential issue may occur, to identify one or more mitigation actions, and the like. The control health variable evaluation and issue mitigation computing platform 110 may then execute an instruction to implement the identified one or more mitigation actions. In some examples, if the objective score is less than the impact threshold, the objective score may be stored for the system control or control health variable to be used in later comparison to historical data to track control health variable values.

In some examples, the control health variable evaluation and issue mitigation computing platform 110 may generate one or more reports, user interfaces, and the like, displaying health of one or more controls, both alone and as compared to other controls. The arrangements described herein provide an objective, standardized display of various control health variables.

Internal computing system 120 and internal computing system 125 may be computing systems associated with (e.g., operated by, owned by, or the like) the entity implementing the control health variable evaluation and issue mitigation computing platform 110. Internal computing system 120, internal computing system 125, and the like, may include one or more desktop computers, laptop computers, servers, and the like. In some examples, internal computing system 120 and/or internal computing system 125 may store data and/or execute processes associated with one or more computing systems, one or more networks, one or more applications, or the like, each having various cyber security system controls or control health variables. In some examples, controls associated with insider threats, malware, internet monitoring, data, and the like, may be evaluated using the processes described herein and an objective evaluation of the health of the controls may be determined in order to understand performance, identify potential issues, identify and executing mitigating actions, and the like. In some examples, the internal computing system 120 and internal computing system 125 may be configured to capture and transmit control health variable data, as one or more batch processes and/or as streaming data. In some examples, controls or control health variables may be evaluated in real-time to provide a glance into the health of one or more systems, processes, controls, or the like.

Local user computing device 150, 155 and remote user computing device 170, 175 may be configured to communicate with and/or connect to one or more computing devices or systems shown in FIG. 1A. For instance, local user computing device 150, 155 may communicate with one or more computing systems or devices via network 190, while remote user computing device 170, 175 may communicate with one or more computing systems or devices via network 195. In some examples, local user computing device 150, 155 may be used to access one or more entity systems, functions or processes. In some examples, local user computing device 150, 155 may be used to access the control health variable evaluation and issue mitigation computing platform 110 to control parameters of the system, update or execute rules, modify settings, display notifications, and the like. In some arrangements, one or more of local user computing device 150, local user computing device 155, remote user computing device 170, and/or remote user computing device 175 may be used to receive notifications, display one or more interactive user interfaces or dashboards, receive user input requesting modifications, and the like.

The remote user computing device 170 and remote user computing device 175 may be used to communicate with, for example, control health variable evaluation and issue mitigation computing platform 110. For instance, remote user computing devices 170, 175 may include user computing devices, such as mobile devices including smartphones, tablets, laptop computers, and the like, that may enable or permit a user to communicate with control health variable evaluation and issue mitigation computing platform 110 to input user preferences, display one or more interactive user interfaces, facilitate modification of one or more user interfaces, and the like.

In one or more arrangements, internal computing system 120, internal computing system 125, local user computing device 150, local user computing device 155, remote user computing device 170, and/or remote user computing device 175 may be any type of computing device or combination of devices configured to perform the particular functions described herein. For example, internal computing system 120, internal computing system 125, local user computing device 150, local user computing device 155, remote user computing device 170, and/or remote user computing device 175 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of internal computing system 120, internal computing system 125, local user computing device 150, local user computing device 155, remote user computing device 170, and/or remote user computing device 175 may, in some instances, be special-purpose computing devices configured to perform specific functions.

Computing environment 100 also may include one or more computing platforms. For example, and as noted above, computing environment 100 may include control health variable evaluation and issue mitigation computing platform 110. As illustrated in greater detail below, control health variable evaluation and issue mitigation computing platform 110 may include one or more computing devices configured to perform one or more of the functions described herein. For example, control health variable evaluation and issue mitigation computing platform 110 may include one or more computers (e.g., laptop computers, desktop computers, servers, server blades, or the like).

As mentioned above, computing environment 100 also may include one or more networks, which may interconnect one or more of control health variable evaluation and issue mitigation computing platform 110, internal computing system 120, internal computing system 125, local user computing device 150, local user computing device 155, remote user computing device 170, and/or remote user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, control health variable evaluation and issue mitigation computing platform 110, internal computing system 120, internal computing system 125, local user computing device 150, and local user computing device 155, may be associated with an organization (e.g., a financial institution), and private network 190 may be associated with and/or operated by the organization, and may include one or more networks (e.g., LANs, WANs, virtual private networks (VPNs), or the like) that interconnect control health variable evaluation and issue mitigation computing platform 110, internal computing system 120, internal computing system 125, local user computing device 150, local user computing device 155, and one or more other computing devices and/or computer systems that are used by, operated by, and/or otherwise associated with the organization. Public network 195 may connect private network 190 and/or one or more computing devices connected thereto (e.g., control health variable evaluation and issue mitigation computing platform 110, internal computing system 120, internal computing system 125, local user computing device 150, local user computing device 155) with one or more networks and/or computing devices that are not associated with the organization. For example, remote user computing device 170, remote user computing device 175, might not be associated with an organization that operates private network 190 (e.g., because remote user computing device 170, remote user computing device 175, may be owned, operated, and/or serviced by one or more entities different from the organization that operates private network 190, such as a second entity different from the entity, one or more customers of the organization, one or more employees of the organization, public or government entities, and/or vendors of the organization, rather than being owned and/or operated by the organization itself), and public network 195 may include one or more networks (e.g., the Internet) that connect remote user computing device 170, remote user computing device 175, to private network 190 and/or one or more computing devices connected thereto (e.g., control health variable evaluation and issue mitigation computing platform 110, internal computing system 120, internal computing system 125, local user computing device 150, local user computing device 155).

Referring to FIG. 1B, control health variable evaluation and issue mitigation computing platform 110 may include one or more processors 111, memory 112, and communication interface 113. A data bus may interconnect processor(s) 111, memory 112, and communication interface 113. Communication interface 113 may be a network interface configured to support communication between control health variable evaluation and issue mitigation computing platform 110 and one or more networks (e.g., private network 190, public network 195, or the like). Memory 112 may include one or more program modules having instructions that when executed by processor(s) 111 cause control health variable evaluation and issue mitigation computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of control health variable evaluation and issue mitigation computing platform 110 and/or by different computing devices that may form and/or otherwise make up control health variable evaluation and issue mitigation computing platform 110.

For example, memory 112 may have, store and/or include a registration module 112a. Registration module 112a may store instructions and/or data that may cause or enable the control health variable evaluation and issue mitigation computing platform 110 to receive registration information from one or more systems, devices, networks, or the like. For instance, one or more systems, devices, networks, or the like, may be registered with the system (e.g., identification information received and stored, and the like) such that data from the registered systems, devices, networks, or the like, may be received and analyzed to evaluate the health of one or more controls.

Control health variable evaluation and issue mitigation computing platform 110 may further have, store and/or include a streaming and/or batch data module 112b. Streaming and/or batch data module 112b may store instructions and/or data that may cause or enable the control health variable evaluation and issue mitigation computing platform 110 to receive data from one or more internal systems, devices, networks, or the like, such as internal computing system 120, internal computing system 125, and the like. The data may be received as batch data at various predetermined times or time intervals and processed in real-time. Additionally or alternatively, the data may be received as streaming data (e.g., real-time streaming data) and may be processed in real-time. In some examples, the streaming and/or batch data module 112b may process the received data for more efficient evaluation. For instance, the received data may be formatted, filtered, compressed, or the like, prior to further processing and evaluation.

Control health variable evaluation and issue mitigation computing platform 110 may further have, store and/or include variable evaluation module 112c. Variable evaluation module 112c may store instructions and/or data that may cause or enable the control health variable evaluation and issue mitigation computing platform 110 to analyzing the streaming and/or batch data received and calculate or determine a measurement for one or more system controls or control health variables based on the data received. For instance, as discussed above, various system controls or control health variables (e.g., data in motion, data at rest, internet monitoring, and the like) in various categories (e.g., efficiency, efficacy, coverage, performance, and the like) may be evaluated to determine or calculate a measure for each control health variable in a respective category. As discussed herein, the measurements may be based on data received (e.g., streaming and/or batch data) and may be determined or calculated in real-time to provide a most current snapshot of the health of each control. As also discussed herein, in at least some examples, the measurement calculated or determined may be in the form of a percentage.

Control health variable evaluation and issue mitigation computing platform 110 may further have, store and/or include variable threshold module 112d. The variable threshold module 112d may store instructions and/or data that may cause or enable the control health variable evaluation and issue mitigation computing platform 110 to identify a plurality of threshold ranges for the particular system control or control health variable being evaluated or analyzed. For instance, in some examples, the identified threshold ranges may be unique to each system control or control health variable being evaluated. Additionally or alternatively, the identified threshold ranges for some system controls or control health variables may be a same set of threshold ranges while other control health variables may have different threshold ranges.

In some examples, the threshold range for each system control or control health variable may be calculated and/or determined in advance of system control or control health variables being evaluated. For instance, threshold ranges for each system control or control health variable may be calculated or determined based on a number of threshold ranges desired, a number of desired values within each threshold range, and the like. In some examples, four threshold ranges may be identified. In some examples, a lowest threshold range may correspond to only one value (e.g., a lowest value, such as 1), and may include measurements that range from zero to a lowest reported value in a predetermined time period (e.g., last six months, previous year, or the like). In some arrangements, the other three threshold ranges may each correspond to three objective score values. Accordingly, three sub-ranges may be identified for each threshold range. In some examples, the threshold range may be based on a predetermined amount of data for the particular system control or control health variable (e.g., six months, one year, or the like) and each threshold range may be based on a standard deviation within the data. Accordingly, for the threshold ranges for each control health variable, a standard deviation may be determined and that may dictate what an overall range is for each threshold. The sub-ranges within each threshold may then be based on how many points (out of a possible 10 points) will be assigned to each range. In examples in which each threshold range for a certain system control or control health variable will have equal numbers of subranges, the overall range for each threshold may be divided by three points to give three sub-ranges. Thus, each system control or control health variable may have three threshold ranges, each including three sub-ranges, and one low value range (e.g., zero to the lowest measured value in the predetermined time).

Control health variable evaluation and issue mitigation computing platform 110 may further have, store and/or include objective score generation module 112e. Objective score generation module 112e may store instructions and/or data that may cause or enable the control health variable evaluation and issue mitigation computing platform 110 to map the determined measurement to a threshold or sub-range within the set of thresholds for that system control or control health variable to identify an objective score on a cyber health scale. In some examples, the cyber health scale may be a scale from 1 to 10, 1 to 100, or the like. In examples in which the scale is from 1 to 10, a value of 1 may be associated with the lowest threshold range (e.g., zero to the lowest measured value in the predetermined time), values 2, 3, and 4 may correspond to a first threshold determined as indicated herein, values 5, 6, and 7 may correspond to a second threshold determined as indicated herein, and values 8, 9, and 10 may correspond to a third threshold determined as indicated herein. Accordingly, the measured value for each control health variable may be mapped to an objective score by the objective score generation module 112e that, because the threshold ranges are established for each system control or control health variable, allows for objective comparison between control health variables.

FIGS. 2A and 2B illustrate example sets of threshold ranges. For instance, as shown in FIG. 2A, for system control or control health variable A, there are 4 threshold ranges. The lowest range (corresponding to an objective score of 1) extends from zero to the lowest recorded value in a predetermined time period (e.g., 49.9). The remaining three threshold ranges are then based on the standard deviation determined from data captured over a predetermined time period (e.g., six months, one year, or the like). In this example, one standard deviation is used for the first threshold range, ½ deviation for the second, and one for the third. Accordingly, as shown, because each of the remaining threshold ranges will be broken into 3 sub-ranges, each corresponding to values on the cyber health scale, the range will be divided by 3. Accordingly, for the first threshold range, each subrange will include values within a range of 6.6 percentage points. For the second threshold, each sub-range will include values within a range of 3.3 percentage points. For the third threshold, each sub-range will include values within a range of 6.6. The number of standard deviations used may be determined based on the data analysis, may be predetermined, or the like.

Accordingly, each sub-range then includes a percentage range that maps to a score on the cyber health scale. Thus, the measured value for the particular system control or control health variable (e.g., control health variable A) may be compared to the threshold ranges to then be mapped to the objective score. In one example, if a measured percentage for control health variable A is 86.4%, that percentage is compared to the threshold ranges and mapped to an objective score of 8 on the cyber health scale.

FIG. 2B illustrates another example arrangement. In FIG. 2B, control health variable B is being evaluated and, again there are four threshold ranges. The lowest range (corresponding to an objective score of 1) extends from zero to the lowest recorded value in a predetermined time period (e.g., 74.4). The remaining three threshold ranges are then based on the standard deviation determined from data captured over a predetermined time period (e.g., six months, one year, or the like). In this example, one standard deviation is used for the first threshold range, one deviation for the second, and three for the third. Accordingly, as shown, because each of the remaining threshold ranges will be broken into 3 sub-ranges, each corresponding to values on the cyber health scale, the range will be divided by 3. Accordingly, for the first threshold range, each subrange will include values within a range of 1.6 percentage points. For the second threshold, each sub-range will include values within a range of 1.6 percentage points. For the third threshold, each sub-range will include values within a range of 5 percentage points. The number of standard deviations used may be determined based on the data analysis, may be predetermined, or the like.

Accordingly, each sub-range then includes a percentage range that maps to a score on the cyber health scale. Thus, the measured value for the particular system control or control health variable (e.g., control health variable B) may be compared to the threshold ranges to then be mapped to the objective score. In one example, if a measured percentage for control health variable B is 86.4%, that percentage is compared to the threshold ranges and mapped to an objective score of 4 on the cyber health scale in this example.

The examples shown in FIGS. 2A and 2B are merely two example arrangements. Various other examples may be used without departing from the invention.

With further reference to FIG. 1B, control health variable evaluation and issue mitigation computing platform 110 may further have, score and/or include a machine learning engine 112$f$ and machine learning datasets 112$g$. Machine learning engine 112$f$ and machine learning datasets 112$g$ may store instructions and/or data that may cause or enable control health variable evaluation and issue mitigation computing platform 110 to receive data associated with a control health variable, receive the objective score indicating a real-time health of the system control or control health variable and determine whether an issue or potential issue may occur. Further, the machine learning engine 112$f$ and machine learning datasets 112$g$ may identify one or more mitigation action to implement or execute in order to mitigate an impact of the issue or potential issue. For instance, machine learning engine 112$f$ may identify patterns in data and associated objective scores to predict a likelihood that an issue is occurring or is going to occur, identify mitigating actions, and the like. The machine learning datasets 112$g$ may be generated based on the recognized patterns (e.g., from analyzed data) and/or may be received from one or more outside sources.

The machine learning engine 112$f$ may receive data from one or more systems, networks, devices the like, as well as an objective score for a particular system control or control health variable and, using one or more machine learning algorithms, may generate one or more machine learning datasets 112$g$. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention. In some examples, the machine learning engine 112$f$ may analyze data to identify patterns of activity, sequences of activity, and the like, to generate one or more machine learning datasets 112$g$.

Based on the generated machine learning datasets 112$g$, one or more mitigating actions may be identified. Accordingly, the output of the machine learning aspects may be used by, for example, the mitigation action instruction generation module 112$h$ to process the identified mitigation action, generate an executable instruction to initiate the mitigation action, and/or transmit the executable instruction to one or more systems, networks, devices, or the like, in order to execute the mitigation action.

Control health variable evaluation and issue mitigation computing platform 110 may further have, store, and/or include a user interface generation module 112$i$. User interface generation module may store instructions and/or data that may cause or enable the control health variable evaluation and issue mitigation computing platform 110 to generate one or more interactive, customizable user interfaces that may be used to display real-time health data (e.g., objective scores generated in real-time) for one or more system controls or control health variables.

FIGS. 3A-3G depict one example illustrative event sequence for implementing and using control health variable evaluation and issue mitigation functions in accordance with one or more aspects described herein. The events shown in the illustrative event sequence are merely one example sequence and additional events may be added, or events may be omitted, without departing from the invention.

Figure 3A:
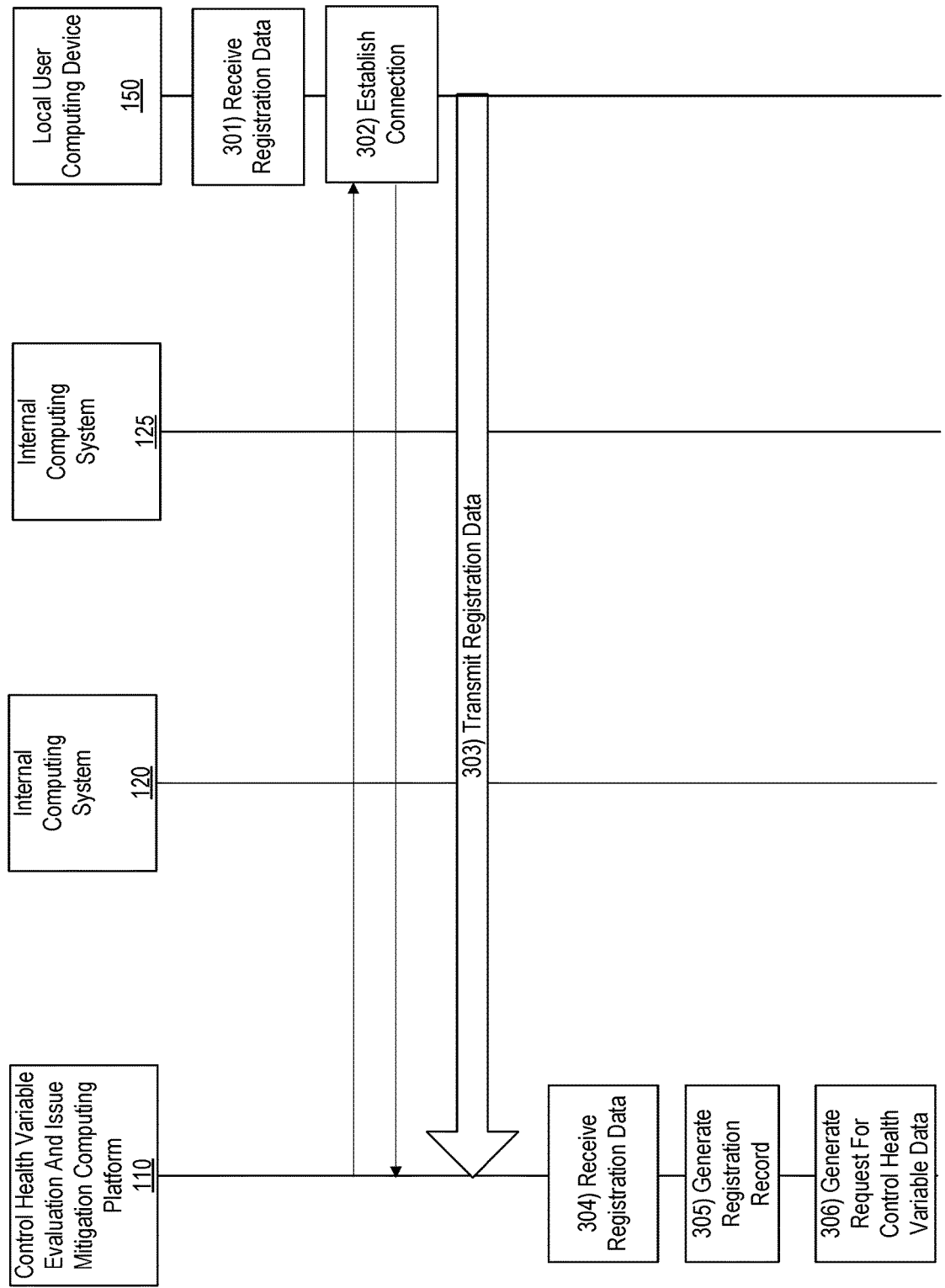
FIGS. 3A-3G depict an illustrative event sequence for implementing dynamic control health variable evaluation and issue mitigation functions in accordance with one or more aspects described herein.

Referring to FIG. 3A, at step 301, registration data may be received. For instance, one or more systems, networks, devices, or the like, may be identified for monitoring. In some examples, the systems, networks, devices, or the like may be identified by a unique identifier associated with hardware and/or software associated with the systems, networks, devices, and the like. Registration data may include a request to monitor one or more system controls or control health variables associated with the systems, networks, devices, or the like, by receiving data from the systems, networks, devices, and the like, and evaluating the data. The registration data may include user input received via, for example, local user computing device 150.

At step 302, a connection may be established between the local user computing device 150 and control health variable evaluation and issue mitigation computing platform 110. For instance, a first wireless connection may be established between the local user computing device 150 and the control health variable evaluation and issue mitigation computing platform 110. Upon establishing the first wireless connection, a communication session may be initiated between the local user computing device 150 and the control health variable evaluation and issue mitigation computing platform 110.

At step 303, the registration data may be transmitted from the local user computing device 150 to the control health variable evaluation and issue mitigation computing platform 110. For instance, the registration data may be transmitted during the communication session initiated upon establishing the first wireless connection.

At step 304, the registration data may be received by the control health variable evaluation and issue mitigation computing platform 110 and, at step 305, a registration record may be generated. In some examples, the registration record may include modifying a database structure to add a database record including the registered devices. In some examples, generating the registration record may further include activating monitoring functions of the control health variable evaluation and issue mitigation computing platform 110 for the registered devices, systems, networks, or the like, initiating communication sessions with one or more systems, networks, devices, or the like, and the like. In some examples, the one or more networks, systems, devices, and the like, may be represented by internal computing system 120, internal computing system 125, and the like.

At step 306, a request for system control or control health variable data may be generated. The request may include identification of systems, networks, devices, and the like, from which data may be received (e.g., registered devices), types of data to receive, whether the data will be received via batch processes or streaming, and the like.

Figure 3B:
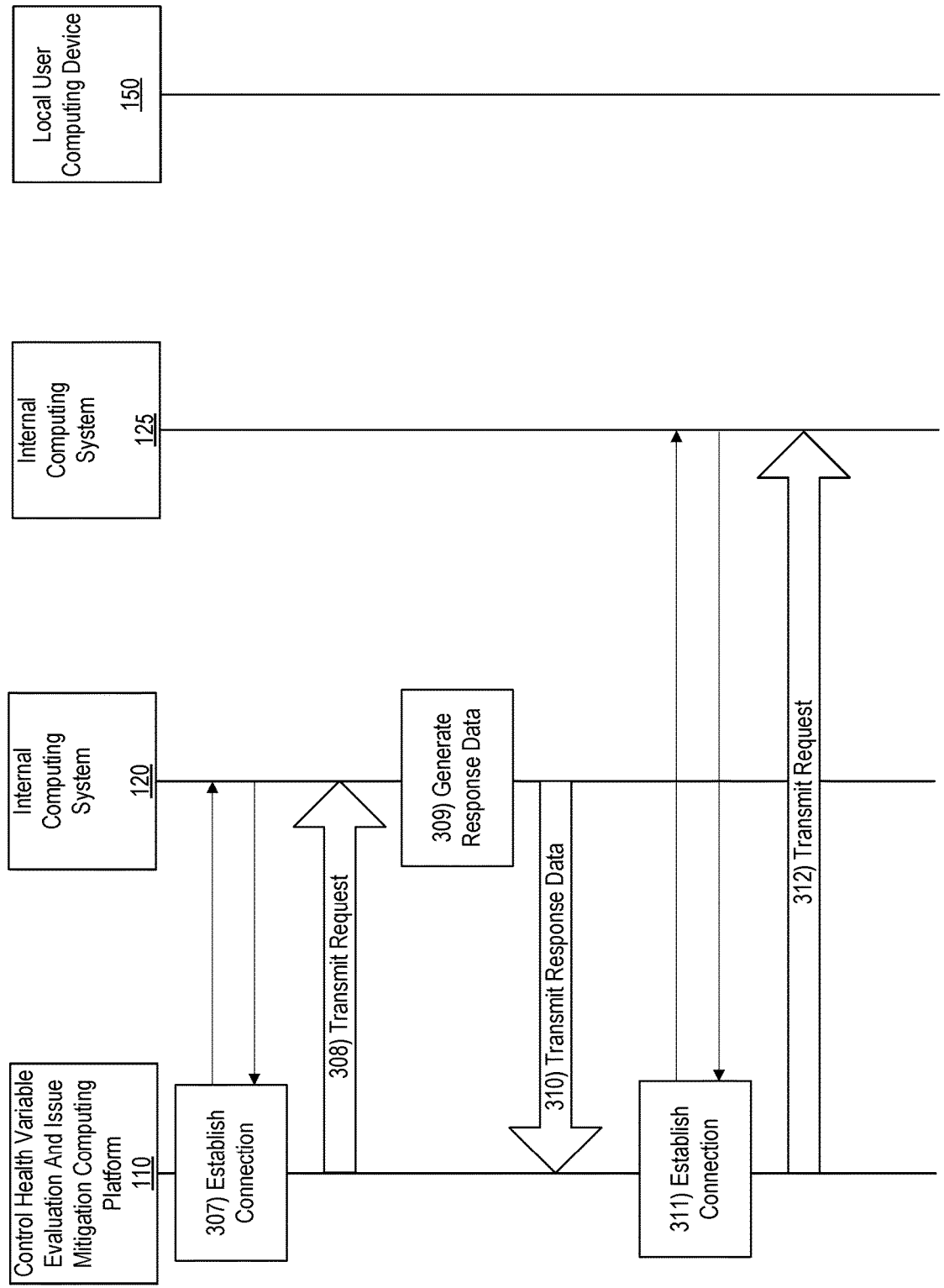

With reference to FIG. 3B, at step 307, a connection may be established between the control health variable evaluation and issue mitigation computing platform 110 and internal computing system 120. For instance, a second wireless connection may be established between the control health variable evaluation and issue mitigation computing platform 110 and internal computing system 120. Upon establishing the second wireless connection, a communication session may be initiated between the control health variable evaluation and issue mitigation computing platform 110 and internal computing system 120.

At step 308, the request for system control or control health variable data may be transmitted from the control health variable evaluation and issue mitigation computing platform 110 to the internal computing system 120. At step 309, system control or control health variable response data may be generated by the internal computing system 120. The system control or control health variable response data may be batch data transmitted at predefined intervals or times, or may be streaming data. Further, the system control or control health variable response data may be data captured from one or more networks, systems, devices, applications, or the like, executing within an entity and captured by internal computing system 120.

At step 310, the generated system control or control health variable response data may be transmitted from the internal computing system 120 to the control health variable evaluation and issue mitigation computing platform 110.

At step 311, a connection may be established between the control health variable evaluation and issue mitigation computing platform 110 and internal computing system 125. For instance, a third wireless connection may be established between the control health variable evaluation and issue mitigation computing platform 110 and internal computing system 125. Upon establishing the third wireless connection, a communication session may be initiated between the control health variable evaluation and issue mitigation computing platform 110 and internal computing system 125.

At step 312, the request for system control or control health variable data may be transmitted from the control health variable evaluation and issue mitigation computing platform 110 to the internal computing system 125.

Figure 3C:
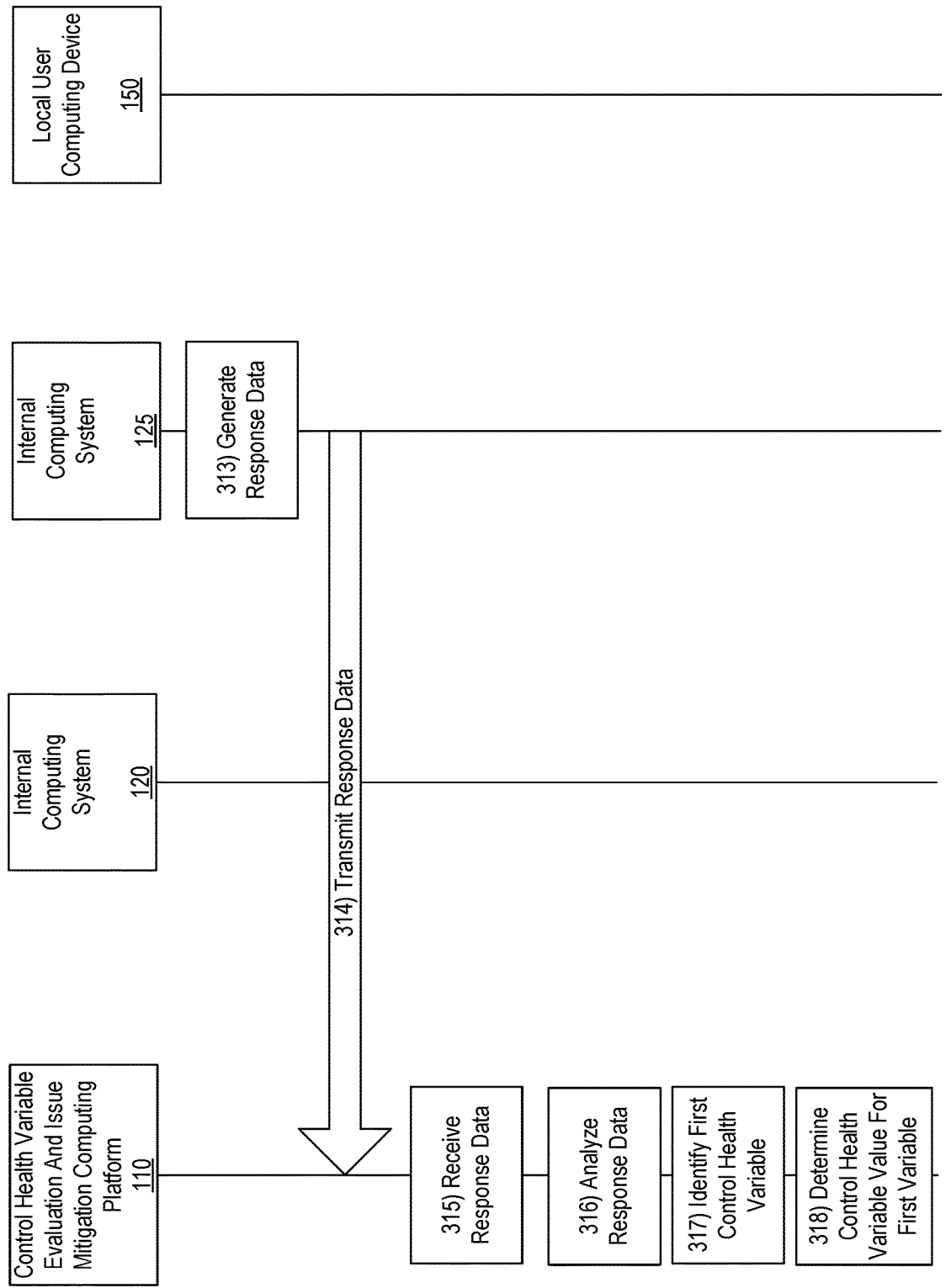

With reference to FIG. 3C, at step 313, system control or control health variable response data may be generated by the internal computing system 125. The system control or control health variable response data may be batch data transmitted at predefined intervals or times, or may be streaming data. Further, the system control or control health variable response data may be data captured from one or more networks, systems, devices, applications, or the like, executing within an entity and captured by internal computing system 125.

At step 314, the generated system control or control health variable response data may be transmitted from the internal computing system 125 to the control health variable evaluation and issue mitigation computing platform 110.

At step 315, the system control or control health variable response data may be received by the control health variable evaluation and issue mitigation computing platform 110. The response data received may be from one or more of internal computing system 120 and/or internal computing system 125.

At step 316, the system control or control health variable response data may be analyzed by the control health variable evaluation and issue mitigation computing platform 110. For instance, the response data may be analyzed to determine or calculate a measurement for one or more different system control or control health variables, as discussed herein.

At step 317, a first system control or control health variable may be identified. For instance, a first system control or control health variable of the one or more system controls or control health variables may be identified for further analysis. At step 318, a first control health variable value may be identified for the first system control or control health variable. For instance, based on the analysis of the response data, the system control or control health variable data may be analyzed to determine or calculate measurements for one or more system controls or control health variables. That measurement may be used to generate a system control or control health variable value for each system control or control health variable analyzed which may be represented as a percentage. The first system control or control health variable value may then be retrieved or identified at step 318.

Figure 3D:
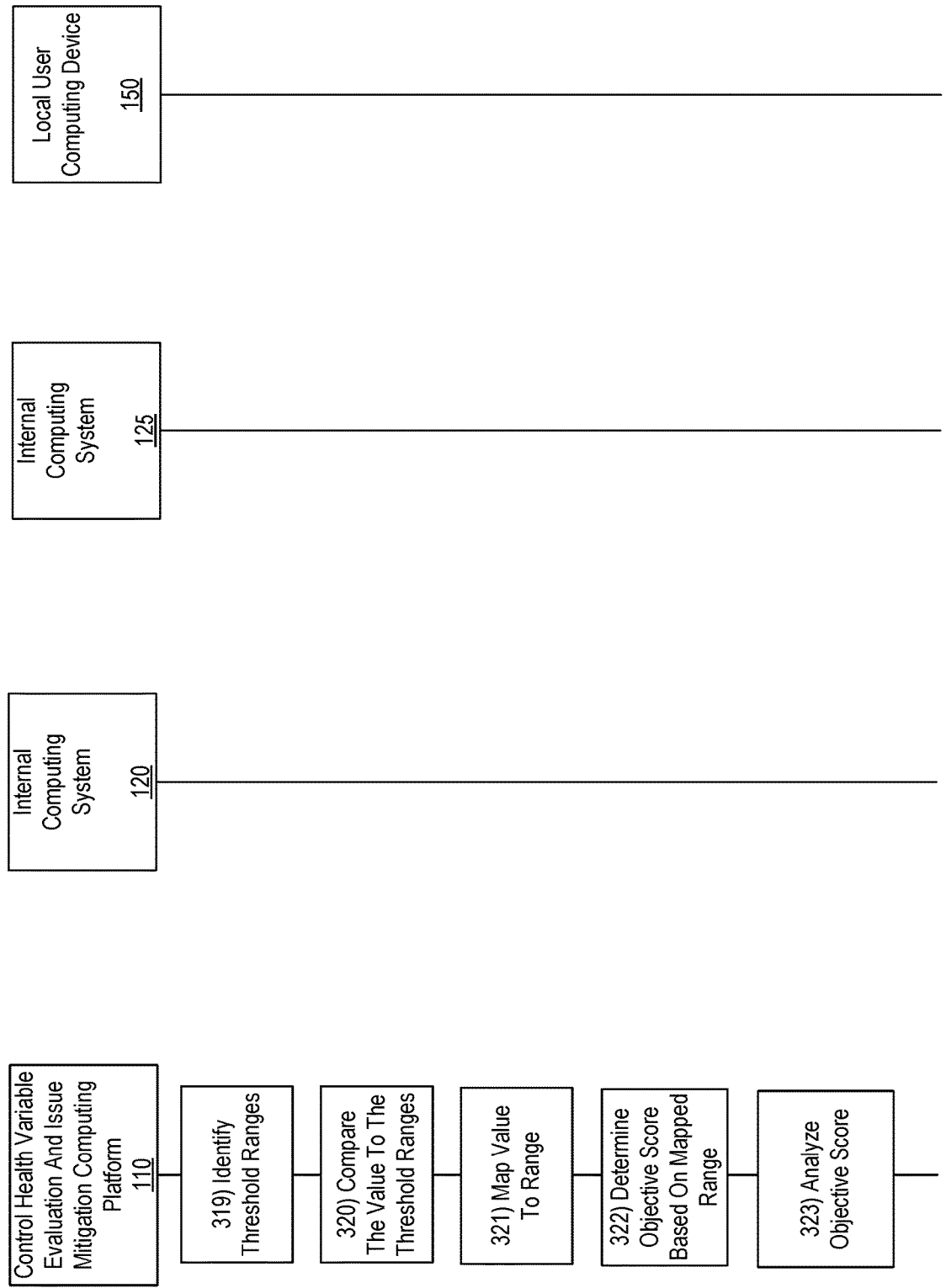

With reference to FIG. 3D, at step 319, threshold ranges for the first system control or control health variable may be identified or retrieved. For instance, as discussed herein, threshold ranges for each system control or control health variable may be determined (e.g., in advance of receiving the response data to be analyzed) based on historical data captured over a predetermined time period. A process for determining the threshold ranges is described above.

At step 320, the first system control or control health variable value may be compared to the threshold ranges for that system control or control health variable to identify a threshold within which the first system control or control variable value falls, as well as a sub-range within the identified threshold range. At step 312, the first system control or control variable value may be mapped to the sub-range and, based on the mapped sub-range, an objective score on a cyber health scale may be identified at step 322.

At step 323, the objective score may be analyzed to determine whether an issue is occurring or is likely to occur and an impact or potential impact of the issue. For instance, machine learning may be used to evaluate the data and the objective score to determine a likelihood that an issue is occurring or will occur. Additionally or alternatively, the objective score may be compared to an impact threshold. If the score is at or above the impact threshold, an issue is occurring or likely to occur and, accordingly, mitigating actions may be identified. If the objective score is below the threshold, the score may be stored for future comparison but an issue is not likely occurring so mitigating actions might not be identified.

Figure 3E:
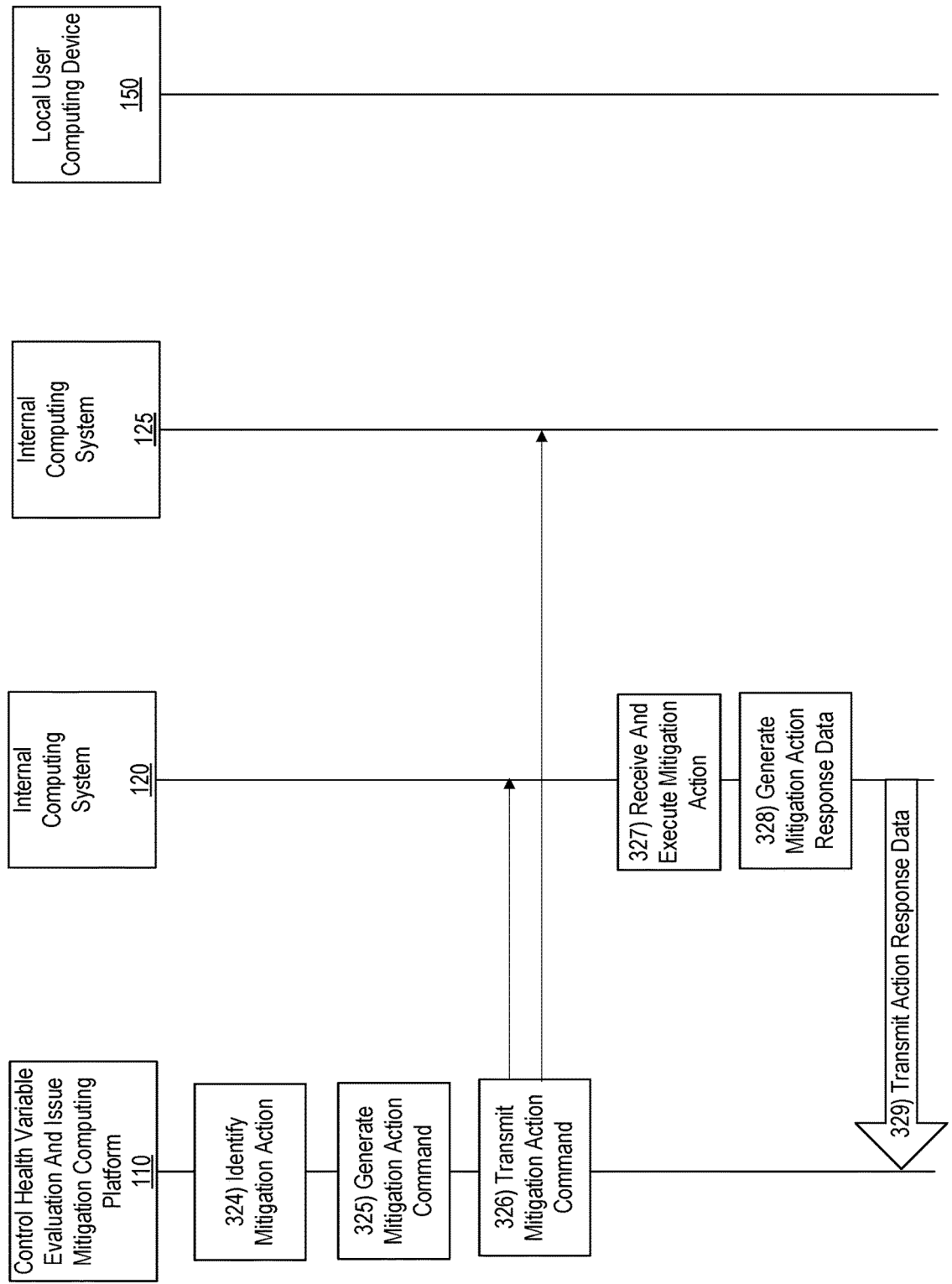

With reference to FIG. 3E, at step 324, based on the analysis of the objective score (and/or other data), one or more mitigation actions may be identified. For instance, one or more actions that may mitigate an impact of an identified issue or potential issue may be identified. In some examples, mitigation actions may include disabling one or more applications and/or access to one or more applications, disabling device access to a network, executing additional virus scan, malware scan, or the like, operations, and the like. In some examples, identifying one or more mitigating actions may be performed using machine learning.

At step 325, a mitigation action command or instruction (e.g., executable instruction) may be generated. For instance, a command or instruction for a particular device, system, or the like, to execute an identified mitigation action may be generated.

At step 326, the generated mitigation action command or instruction may be transmitted to one or more devices, systems, or the like, such as internal computing system 120 and/or internal computing system 125. At step 327, the mitigation action command or instruction may be received by, for instance, internal computing system 120, and executing by internal computing system 120.

At step 328, mitigation action response data may be generated by internal computing system 120. For instance, an indication that the mitigation action was executed, was successful, or the like, may be generated by internal computing system 120. At step 329, the mitigation action response data may be transmitted to the control health variable evaluation and issue mitigation computing platform 110.

Figure 3F:
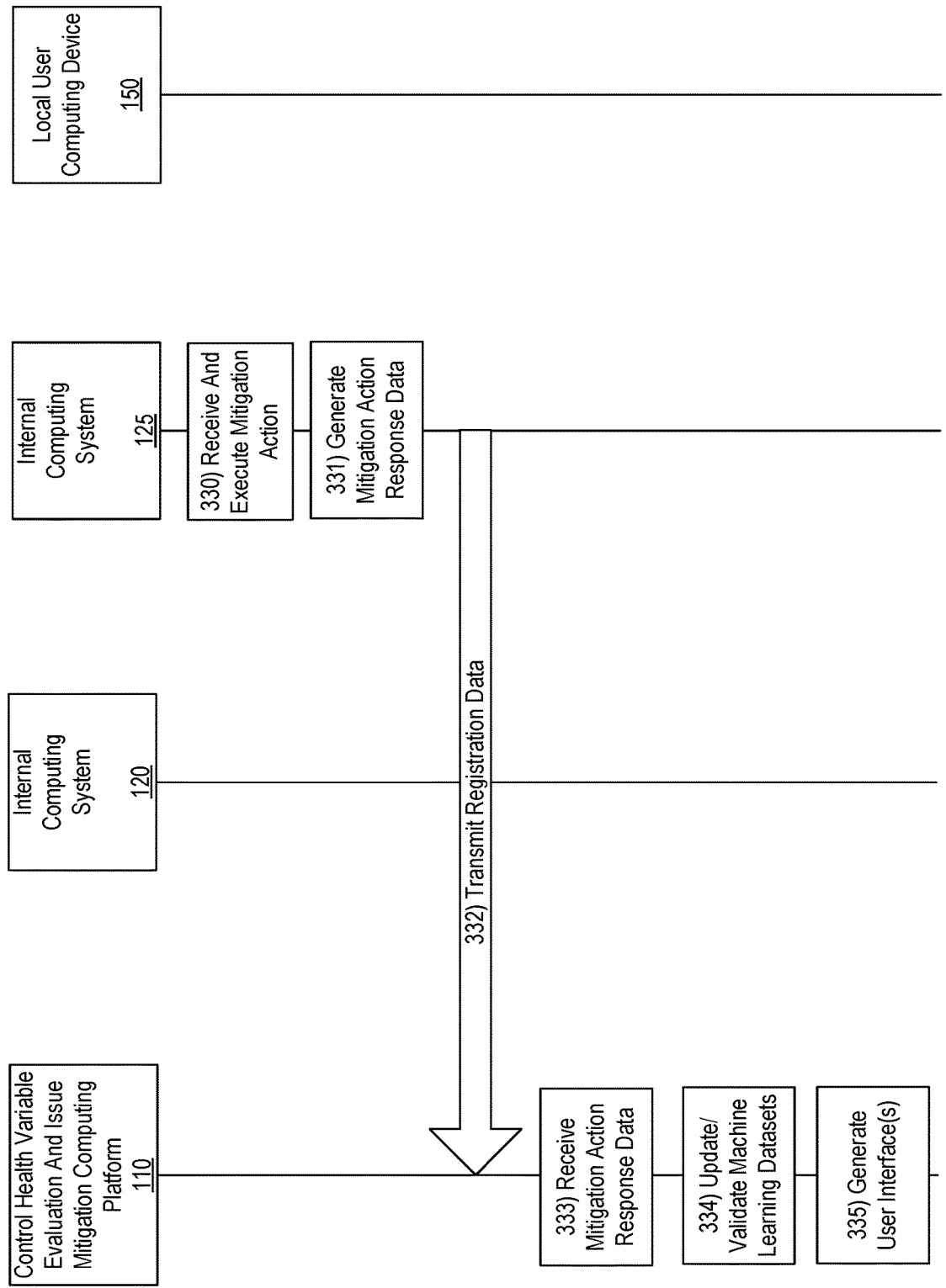

With reference to FIG. 3F, at step 330, the mitigation action command or instruction may be received by, for instance, internal computing system 125, and executing by internal computing system 125.

At step 331, mitigation action response data may be generated by internal computing system 125. For instance, an indication that the mitigation action was executed, was successful, or the like, may be generated by internal computing system 125. At step 332, the mitigation action response data may be transmitted to the control health variable evaluation and issue mitigation computing platform 110.

At step 333, the mitigation action response data may be received by the control health variable evaluation and issue mitigation computing platform 110. For instance, mitigation action response data may be received from one or more of internal computing system 120, internal computing system 125, or other similar system, device, or the like.

At step 334, the received mitigation action response data may be analyzed and one or more machine learning datasets may be updated and/or validated based on the mitigation action response data.

At step 335, one or more interactive user interfaces may be generated. In some examples, the interactive user interfaces may include an interactive dashboard providing information about the health of one or more control health variables, systems, networks, devices, or the like.

Figure 3G:
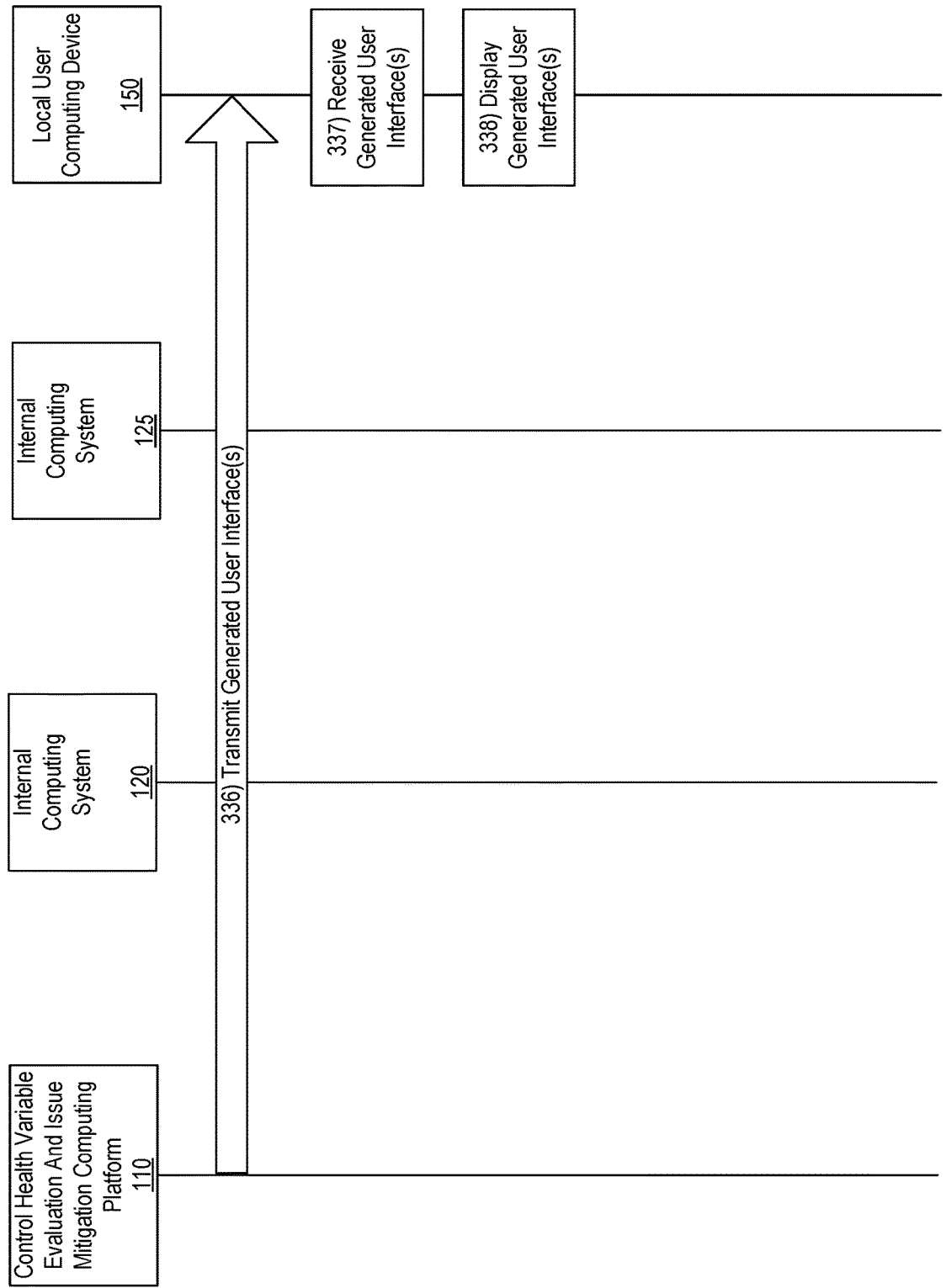

With reference to FIG. 3G, at step 336, the generated user interfaces may be transmitted to local user computing device 150. At step 337, the generated user interfaces may be received by local user computing device 150 and displayed by a display of the device 150 at step 338.

Figure 4:
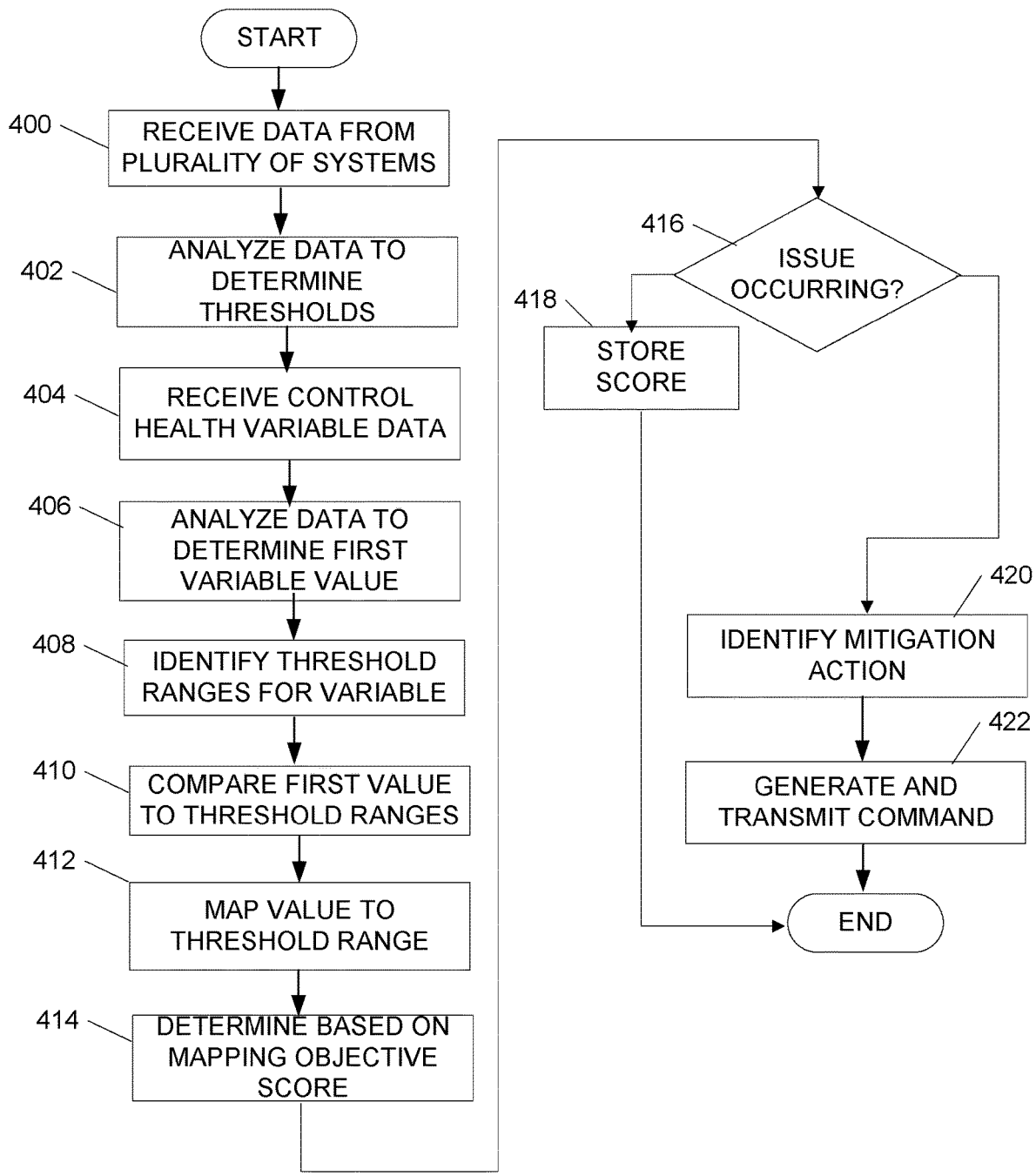
FIG. 4 depicts an illustrative method for implementing and using dynamic control health variable evaluation and issue mitigation functions according to one or more aspects described herein.

FIG. 4 is a flow chart illustrating one example method of dynamically monitoring and evaluating system controls or control health variables to identify and mitigate issues according to one or more aspects described herein. The processes illustrated in FIG. 4 are merely some example processes and functions. The steps shown may be performed in the order shown, in a different order, more steps may be added, or one or more steps may be omitted, without departing from the invention.

In some examples, one or more aspects described with respect to FIG. 4 may be performed in real-time.

At step 400, a data may be received from a plurality of data sources, such as various systems, devices, networks, applications, and the like. In some examples, the data may be collected over a predetermined time period, such as six months, one year, or the like. At step 402, the data may be analyzed for a plurality of system controls or control health variables and a plurality of threshold ranges for each control health variable may be determined or identified. As discussed herein, in some examples, each control health variable may have four threshold ranges with a first range including measured values from zero to a lowest recorded value in a time period, and the remaining three ranges each including a plurality of sub-ranges. The thresholds and/or sub-ranges may then correspond to an objective score on a cyber health scale.

In some examples, each system control or control health variable may have a unique set of threshold ranges, such that each plurality of threshold ranges is unique to a respective system control or control health variable. Additionally or alternatively, the cyber health scale may be a same scale for all control health variables, thereby allowing for objective comparison between different system control or control health variables.

At step 404, system control or control health variable data may be received from a plurality of sources. In some examples, the system control or control health variable data may include batch data received at a plurality of intervals and/or real-time streaming data.

At step 406, the received system control or control health variable data may be analyzed to determine a value for each system control or control health variable. For instance, a first system control or control health variable may be identified within the received data and a first system control or control health variable value may be determined. In some examples, the first system control or control health variable value may be a percentage based on a measurement unique to the first system control or control health variable, as discussed herein.

At step 408, a plurality of threshold ranges associated with the first system control or control health variable may be determined or identified. For instance, the plurality of threshold ranges associated with the first system control or control health variable and determined in steps 400 and 402 may be retrieved.

At step 410, the first system control or control health variable value may be compared to the identified plurality of threshold ranges associated with the first system control or control health value to map the first system control or control health variable value to a threshold range of the plurality of threshold ranges associated with the first system control or control health variable at step 412. In some examples, one or more threshold ranges of the plurality of threshold ranges may include a plurality of sub-ranges and the first system control or control health variable value may be mapped to a sub-range.

At step 414, an objective score on a cyber health scale for the first system control or control health variable may be determined based on the mapping of the first system control or control health variable value. In some examples, the cyber health scale may be a same scale for all system control or control health variables. Accordingly, as each system control or control health variable has different threshold ranges for identifying an issue, an objective score may be generated from the unique mapping to allow objective comparison between system controls or control health variables.

At step 416, a determination may be made as to whether an issue is occurring or is likely to occur. In some examples, machine learning may be used to analyze the data and objective score to determine whether an issue is occurring or is likely to occur. Additionally or alternatively, the objective score may be compared to an impact threshold. If the objective score is at or above the impact threshold, an issue for which mitigation may be desired may be occurring or likely to occur. If the objective score is below the impact threshold, an issue for which mitigation is desired might not be occurring.

If, at step 416, a determination is made that an issue is occurring or is likely to occur, one or more mitigation actions may be identified at step 420. In some examples, machine learning may be used to identify the one or more mitigation actions (e.g., based on patterns in data, objective score, and the like). Additionally or alternatively, user input may be received identifying the one or more mitigation actions.

At step 422, a command to execute the identified one or more mitigation actions may be generated and transmitted to one or more devices, systems, or the like.

If, at step 416, a determination is made that an issue is not occurring, the objective score may be stored at step 418 for later comparison and further analysis.

Figure 5:
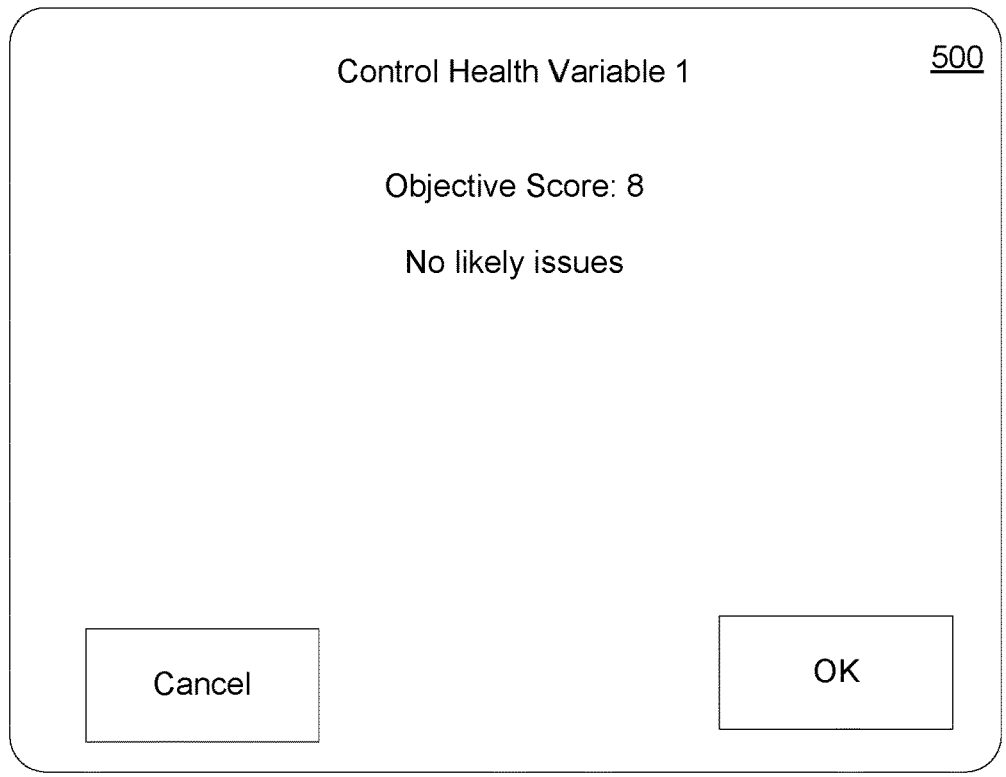
FIG. 5 illustrates one example interactive user interface that may be generated according to one or more aspects described herein.

FIG. 5 illustrates one example interactive user interface that may be generated in accordance with one or more aspects described herein. The interactive user interface 500 shown provides a snapshot of the overall health of a particular system control or control health variable. For instance, as shown in interface 500, the objective score for a particular system control or control health variable (e.g., control health variable 1) is shown, as well as an indication that there are likely no issues with that particular system control or control health variable. In some arrangements, this data may represent real-time evaluation of the system control or control health variable. In some examples, one or more elements of the user interface 500 may be interactive to provide additional information, enable modification of the variable shown, request historical data, modify presentation of data, and the like. For instance, selection of a field, hovering over a field, or the like, may prompt display of additional interactive user interfaces to modify the data provided, provide additional or alternate data, or the like.

Figure 6:
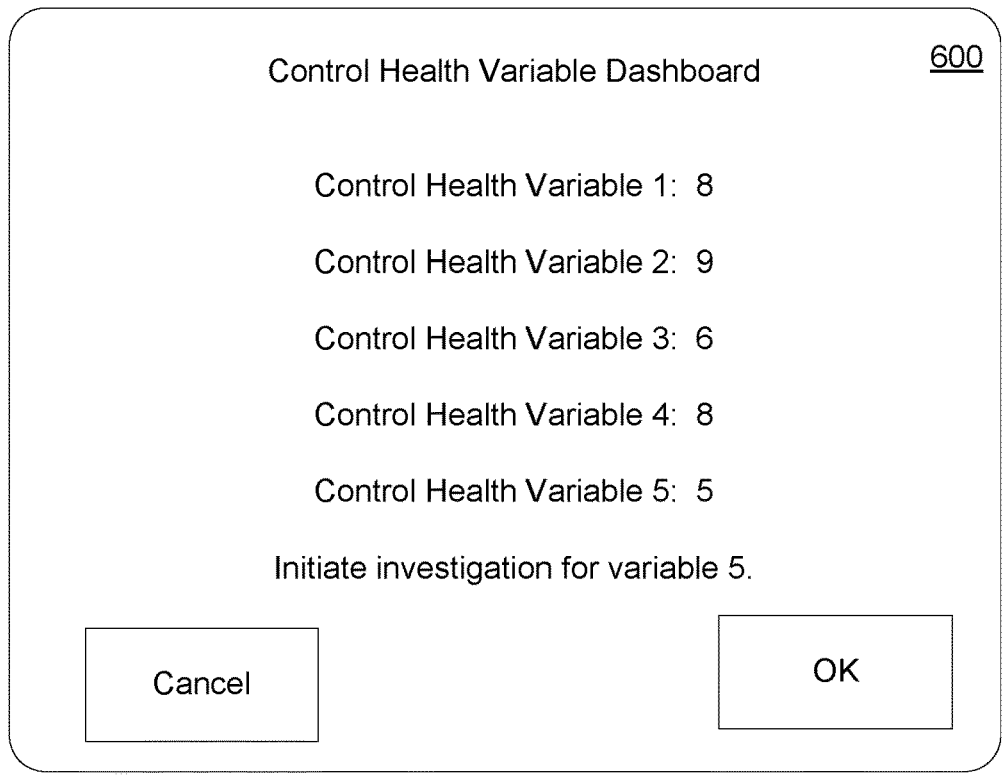
FIG. 6 illustrates another example interactive user interface that may be generated according to one or more aspects described herein.

FIG. 6 illustrates another example user interface that may be generated in accordance with one or more aspects described herein. As shown in interactive interface 600, a status or objective score for multiple different system control or control health variables is displayed. In addition, a recommendation to investigate one variable having a lower than desired objective score may be provided. Similar to the interface 500 of FIG. 5, the interactive user interface 600 may include one or more elements that may be interactive to provide additional information, enable modification of the variable shown, request historical data, modify presentation of data, and the like. For instance, selection of a field, hovering over a field, or the like, may prompt display of additional interactive user interfaces to modify the data provided, provide additional or alternate data, or the like.

The interactive user interfaces illustrated in FIGS. 5 and 6 are merely some example interfaces that may be generated in accordance with aspects described herein. Various user interfaces displaying additional and/or alternate information may be generated and displayed without departing from the invention.

Aspects described herein provide real-time, objective evaluation of one or more system controls or control health variables. Accordingly, based on this evaluation, standardized metrics for a health of a system control or control health variable may be determined and used to efficiently and effectively identify issues, initiate mitigation actions, allocate computing resources, and the like. The arrangements described herein may enable a proactive approach to issue identification and mitigation and may reduce or eliminate impact associated with one or more issues based on early detection or prediction and action taken. In addition, the arrangements described herein provide a control health framework that enables tracking, reporting, and the like, of a status of various system controls or control health variables.

Figure 7:
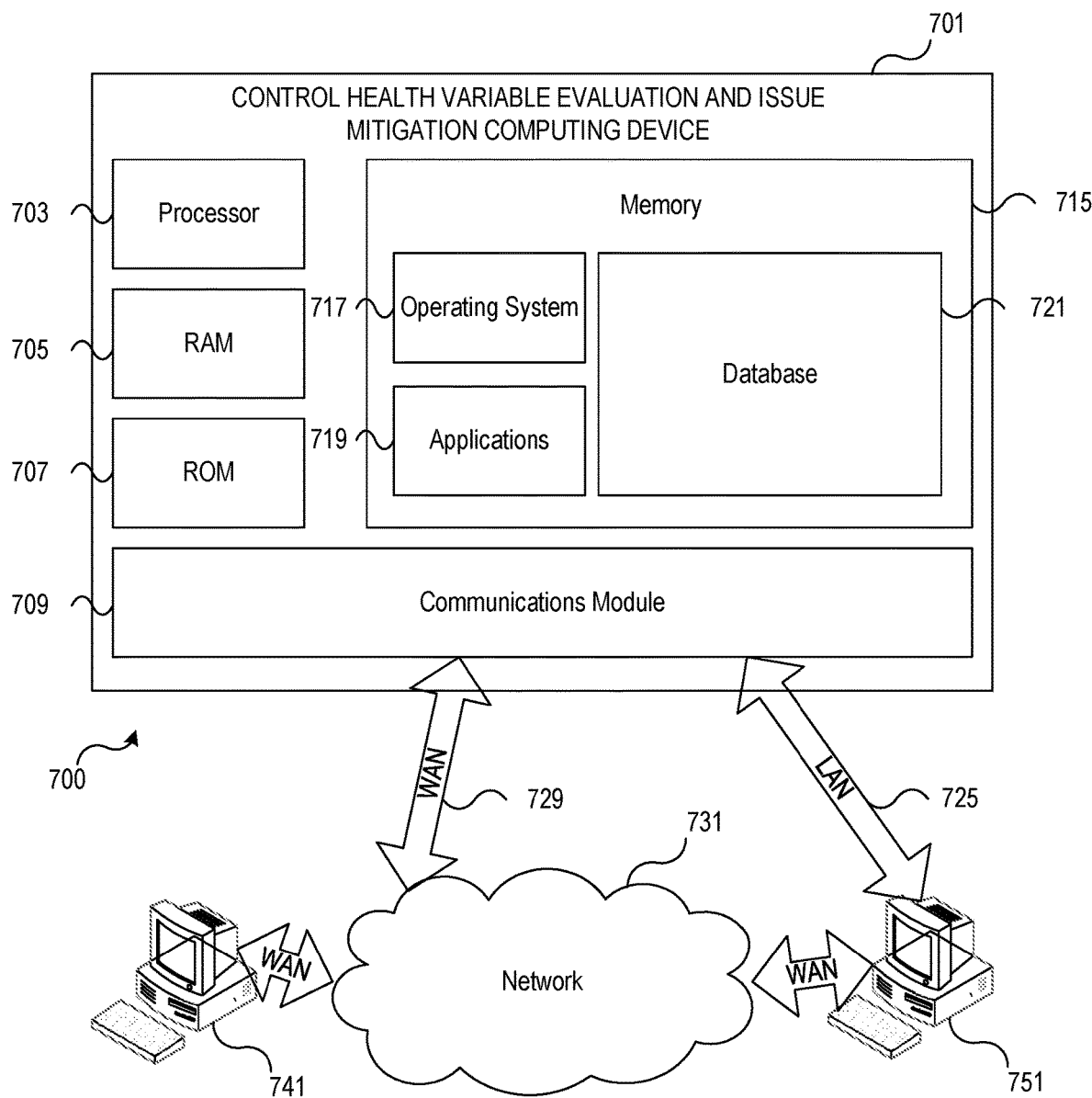
FIG. 7 illustrates one example operating environment in which various aspects of the disclosure may be implemented in accordance with one or more aspects described herein.

FIG. 7 depicts an illustrative operating environment in which various aspects of the present disclosure may be implemented in accordance with one or more example embodiments. Referring to FIG. 7, computing system environment 700 may be used according to one or more illustrative embodiments. Computing system environment 700 is only one example of a suitable computing environment and is not intended to suggest any limitation as to the scope of use or functionality contained in the disclosure. Computing system environment 700 should not be interpreted as having any dependency or requirement relating to any one or combination of components shown in illustrative computing system environment 700.

Computing system environment 700 may include control health variable evaluation and issue mitigation computing device 701 having processor 703 for controlling overall operation of control health variable evaluation and issue mitigation computing device 701 and its associated components, including Random Access Memory (RAM) 705, Read-Only Memory (ROM) 707, communications module 709, and memory 715. Control health variable evaluation and issue mitigation computing device 701 may include a variety of computer readable media. Computer readable media may be any available media that may be accessed by control health variable evaluation and issue mitigation computing device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by control health variable evaluation and issue mitigation computing device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on control health variable evaluation and issue mitigation computing device 701. Such a processor may execute computer-executable instructions stored on a computer-readable medium.

Software may be stored within memory 715 and/or storage to provide instructions to processor 703 for enabling control health variable evaluation and issue mitigation computing device 701 to perform various functions as discussed herein. For example, memory 715 may store software used by control health variable evaluation and issue mitigation computing device 701, such as operating system 717, application programs 719, and associated database 721. Also, some or all of the computer executable instructions for control health variable evaluation and issue mitigation computing device 701 may be embodied in hardware or firmware. Although not shown, RAM 705 may include one or more applications representing the application data stored in RAM 705 while control health variable evaluation and issue mitigation computing device 701 is on and corresponding software applications (e.g., software tasks) are running on control health variable evaluation and issue mitigation computing device 701.

Communications module 709 may include a microphone, keypad, touch screen, and/or stylus through which a user of control health variable evaluation and issue mitigation computing device 701 may provide input, and may also include one or more of a speaker for providing audio output and a video display device for providing textual, audiovisual and/or graphical output. Computing system environment 700 may also include optical scanners (not shown).

Control health variable evaluation and issue mitigation computing device 701 may operate in a networked environment supporting connections to one or more remote computing devices, such as computing devices 741 and 751. Computing devices 741 and 751 may be personal computing devices or servers that include any or all of the elements described above relative to control health variable evaluation and issue mitigation computing device 701.

The network connections depicted in FIG. 7 may include Local Area Network (LAN) 725 and Wide Area Network (WAN) 729, as well as other networks. When used in a LAN networking environment, control health variable evaluation and issue mitigation computing device 701 may be connected to LAN 725 through a network interface or adapter in communications module 709. When used in a WAN networking environment, control health variable evaluation and issue mitigation computing device 701 may include a modem in communications module 709 or other means for establishing communications over WAN 729, such as network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 8:
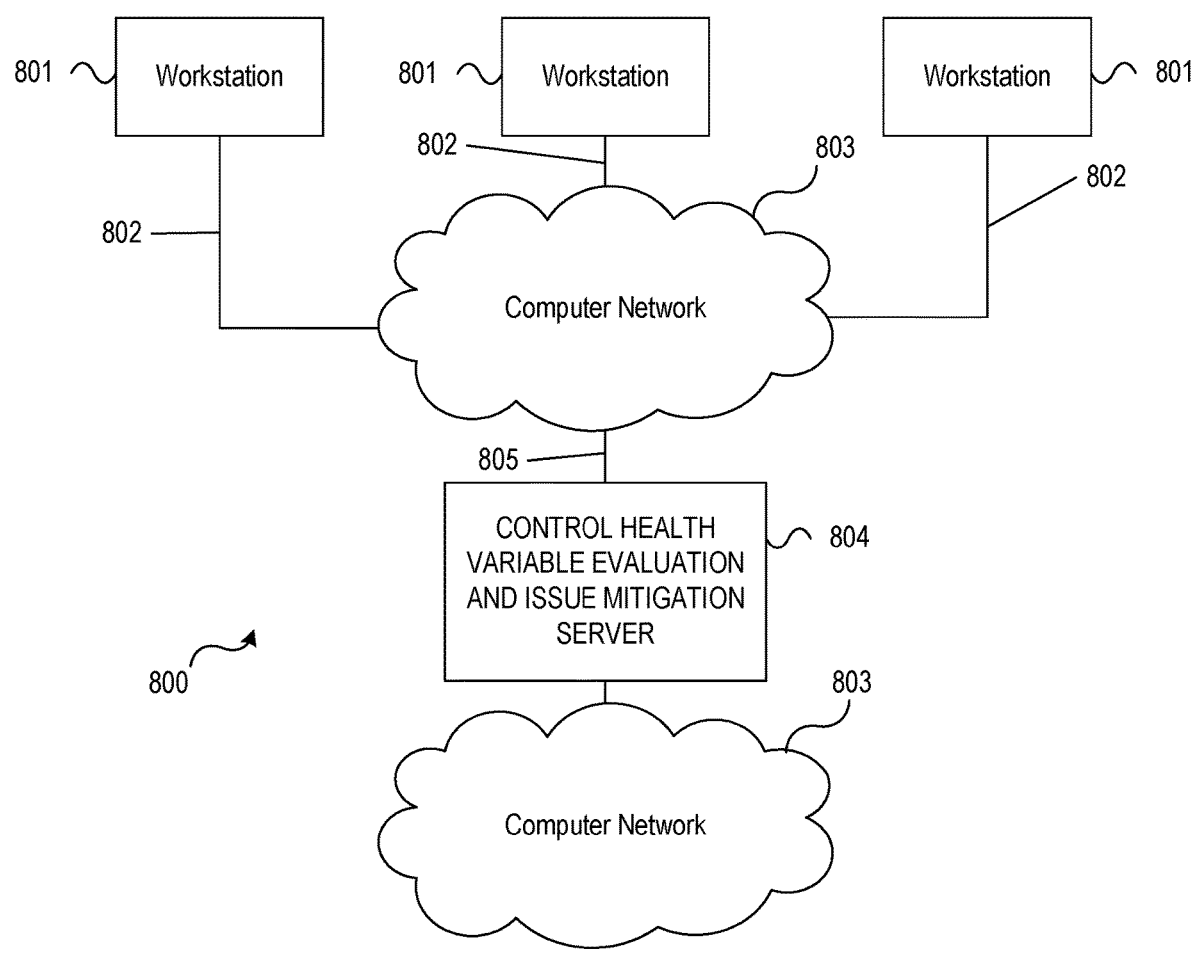
FIG. 8 depicts an illustrative block diagram of workstations and servers that may be used to implement the processes and functions of certain aspects of the present disclosure in accordance with one or more aspects described herein.

FIG. 8 depicts an illustrative block diagram of workstations and servers that may be used to implement the processes and functions of certain aspects of the present disclosure in accordance with one or more example embodiments. Referring to FIG. 8, illustrative system 800 may be used for implementing example embodiments according to the present disclosure. As illustrated, system 800 may include one or more workstation computers 801. Workstation 801 may be, for example, a desktop computer, a smartphone, a wireless device, a tablet computer, a laptop computer, and the like, configured to perform various processes described herein. Workstations 801 may be local or remote, and may be connected by one of communications links 802 to computer network 803 that is linked via communications link 805 to control health variable evaluation and issue mitigation server 804. In system 800, control health variable evaluation and issue mitigation server 804 may be a server, processor, computer, or data processing device, or combination of the same, configured to perform the functions and/or processes described herein. Server 804 may be used to generate requests for offers, evaluate offers received, generate counter offers, present offers to users, and the like.

Computer network 803 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. Communications links 802 and 805 may be communications links suitable for communicating between workstations 801 and control health variable evaluation and issue mitigation server 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
      receive, from a plurality of sources, system control data;
      analyze the system control data, in real-time, to determine a first system control value for a first system control of a plurality of system controls;
      identify, for the first system control, a plurality of threshold ranges associated with the first system control;
      compare the first system control value to the plurality of threshold ranges;
      map the first system control value to a threshold range of the plurality of threshold ranges based on the comparing;
      based on the mapping, determine an objective score on a cyber health scale, the cyber health scale being a same scale for all system controls of the plurality of system controls;
      analyze, using machine learning, the objective score to determine whether an issue is occurring;
      responsive to determining that an issue is occurring:
         identify at least one mitigation action to implement;
         generate and transmit a command to execute the at least one mitigation action; and
      responsive to determining that an issue is not occurring, storing the determined objective score for the first system control.

2. The computing platform of claim 1, wherein the system control data includes batch data received at predetermined intervals.

3. The computing platform of claim 1, wherein the system control data includes real-time streaming data.

4. The computing platform of claim 1, wherein identifying at least one mitigation action to implement is based on machine learning.

5. The computing platform of claim 1, further including instructions that, when executed, cause the computing platform to:
   prior to receiving the system control data:
      receiving historical data from the plurality of sources for a predetermined time period; and
      analyzing the historical data to identify a plurality of threshold ranges for each system control of the plurality of system controls, wherein each plurality of threshold ranges is unique to a respective system control.

6. The computing platform of claim 5, wherein each threshold range in each plurality of threshold ranges includes a plurality of sub-ranges.

7. The computing platform of claim 1, wherein the command to execute the at least one mitigation action is transmitted to at least one source of the plurality of sources.

8. A method, comprising:
   by a computing platform comprising at least one processor, memory, and a communication interface:
      receiving, by the at least one process and from a plurality of sources via the communication interface, system control data;
      analyzing, by the at least one processor, the system control data, in real-time, to determine a first system control value for a first system control of a plurality of system controls;
      identifying, by the at least one processor and for the first system control, a plurality of threshold ranges associated with the first system control;

comparing, by the at least one processor, the first system control value to the plurality of threshold ranges;

mapping, by the at least one processor, the first system control value to a threshold range of the plurality of threshold ranges based on the comparing;

based on the mapping, determining, by the at least one processor, an objective score on a cyber health scale, the cyber health scale being a same scale for all system controls of the plurality of system controls;

analyzing, by the at least one processor and using machine learning, the objective score to determine whether an issue is occurring;

if it is determined that an issue is occurring:
identifying, by the at least one processor, at least one mitigation action to implement;
generating and transmitting, by the at least one processor, a command to execute the at least one mitigation action; and if it is determined that an issue is not occurring, storing the determined objective score for the first system control.

9. The method of claim 8, wherein the system control data includes batch data received at predetermined intervals.

10. The method of claim 8, wherein the system control data includes real-time streaming data.

11. The method of claim 8, wherein identifying at least one mitigation action to implement is based on machine learning.

12. The method of claim 8, further including:
prior to receiving the system control data:
receiving, by the at least one processor and via the communication interface, historical data from the plurality of sources for a predetermined time period; and
analyzing, by the at least one processor, the historical data to identify a plurality of threshold ranges for each system control of the plurality of system controls, wherein each plurality of threshold ranges is unique to a respective system control.

13. The method of claim 12, wherein each threshold range in each plurality of threshold ranges includes a plurality of sub-ranges.

14. The method of claim 8, wherein the command to execute the at least one mitigation action is transmitted to at least one source of the plurality of sources.

15. One or more non-transitory computer-readable media storing instructions that, when executed by a computing platform comprising at least one processor, memory, and a communication interface, cause the computing platform to:
receive, from a plurality of sources, system control data;
analyze the system control data, in real-time, to determine a first system control value for a first system control of a plurality of system controls;
identify, for the first system control, a plurality of threshold ranges associated with the first system control;
compare the first system control value to the plurality of threshold ranges;
map the first system control value to a threshold range of the plurality of threshold ranges based on the comparing;
based on the mapping, determine an objective score on a cyber health scale, the cyber health scale being a same scale for all system controls of the plurality of system controls;
analyze, using machine learning, the objective score to determine whether an issue is occurring;
responsive to determining that an issue is occurring:
identify at least one mitigation action to implement;
generate and transmit a command to execute the at least one mitigation action; and
responsive to determining that an issue is not occurring, storing the determined objective score for the first system control.

16. The one or more non-transitory computer-readable media of claim 15, wherein the system control data includes batch data received at predetermined intervals.

17. The one or more non-transitory computer-readable media of claim 15, wherein the system control data includes real-time streaming data.

18. The one or more non-transitory computer-readable media of claim 15, wherein identifying at least one mitigation action to implement is based on machine learning.

19. The one or more non-transitory computer-readable media of claim 15, further including instructions that, when executed, cause the computing platform to:
prior to receiving the system control data:
receiving historical data from the plurality of sources for a predetermined time period; and
analyzing the historical data to identify a plurality of threshold ranges for each system control of the plurality of system controls, wherein each plurality of threshold ranges is unique to a respective system control.

20. The one or more non-transitory computer-readable media of claim 19, wherein each threshold range in each plurality of threshold ranges includes a plurality of sub-ranges.

21. The one or more non-transitory computer-readable media of claim 15, wherein the command to execute the at least one mitigation action is transmitted to at least one source of the plurality of sources.

* * * * *